United States Patent Office 2,918,391
Patented Dec. 22, 1959

2,918,391

RESINOUS COATING COMPOSITION, METHOD OF PREPARING AND METHOD OF COATING WITH SAME

Walter John Hornibrook, Philadelphia, Pa., assignor to E. I. du Pont de Nemours and Company, Wilmington, Del., a corporation of Delaware No Drawing. Application October 11, 1956
Serial No. 615,229

14 Claims. (Cl. 117—75)

This invention relates to a coating composition and more particularly to an aqueous coating composition containing a copolymer which is at least ternary in composition and a water-dilutable heat-reactive formaldehyde condensation resin.

Most polymeric coatings are deposited from a solution of film-forming components in a volatile organic solvent; few are deposited from an aqueous dispersion. Solution coating compositions have several disadvantages. First, volatile organic solvents are costly and sometimes noxious. Second, the viscosity of solution coating compositions varies significantly with the amount and molecular weight of the dissolved film former. Also, the application characteristics of solution coatings often make it necessary to apply many coatings of a material with a low percentage of solids.

Aqueous dispersion coatings avoid the aforementioned disadvantages of solution coating compositions; in addition, higher molecular weight polymers can be used with aqueous compositions than with organic solution coatings. However, known aqueous dispersion coatings are not, for example, suitable primers for appliance and automobile finishes of conventional alkyd/melamine, alkyd/urea, and alkyd/melamine/urea formaldehyde resins because the known dispersions do not form tough, smooth, water-resistant coatings which adhere well to the finishes.

I have discovered a composition which has the ordinary advantages of aqueous dispersion coatings and, in addition, is a good primer coating.

The coating composition of this invention comprises an aqueous dispersion of a copolymer and a water-dilutable heat-reactive formaldehyde condensation resin. The copolymer is the polymerization product of at least a ternary mixture of copolymerizable monomers consisting of (A) about 20 to 70 parts by weight of at least one polymerizable vinylbenzene monomer, (B) about 1 to 20 parts by weight of at least one alpha-olefinic monocarboxylic acid having a methylene group bonded to the alpha-carbon atom and (C) at least one ester of one of the alpha-olefinic monocarboxylic acids with a saturated aliphatic monohydric alcohol of from 1 to 8 carbon atoms as the balance for a total of 100 parts by weight of monomeric mixture; preferably, the copolymer is the polymerization product of at least a ternary mixture of monomers consisting of (A) 40 to 60 parts by weight of at least one polymerizable vinylbenzene monomer, (B) from 3 to 15 parts by weight of at least one alpha-olefinic monocarboxylic acid and (C) at least one ester of the monocarboxylic acid with a monohydric alcohol of from 1 to 8 carbon atoms as the balance for a total of 100 parts by weight. For each 100 parts by weight of the copolymer, the composition includes about from 5 to 300, and preferably, from 25 to 70 parts by weight of a water-dilutable heat-reactive formaldehyde condensation resin.

The coating composition of this invention is prepared by dispersing the monomers for the copolymer in water, polymerizing the monomers and adding the water-dilutable, heat-reactive formaldehyde condensation resin to the aqueous dispersion of the copolymer.

The copolymer is formed by the well-known methods of emulsion polymerization. In the preferred embodiment, a dispersing agent is first added to the water along with an initiator for the polymerization reaction. A wide variety of dispersing agents can be used, including, for example, sodium lauryl sulfate, polyoxyethylene, polyoxypropylene, colloidal silica, non-ionic organic phosphates and magnesium montmorillonite clay. Usually, the dispersing agent constitutes from 0.25 to 4% of the monomer charge depending on the particular agent and combination of monomers.

The initiators are of the redox (reduction-oxidation) type and include, for example, sodium bisulfite and potassium persulfate, inorganic peroxides, organic peroxides, salts of inorganic peroxides and azo nitrile. The sodium bisulfite-potassium persulfate combination is preferred.

After the initiators and dispersing agent have been dissolved in the water, the monomers are dispersed in the agitated aqueous solution. Preferably, the total concentration of monomers in the aqueous polymerization charge ranges from 25 to 45% by weight, although concentrations up to 70% are operative.

The polymerizable vinyl benzene monomers which are used as one of the components for preparing the copolymer include sytrene, methyl substituted vinylbenzenes, such as alpha-methyl styrene, and ring-substituted methyl vinylbenzenes, such as vinyl toluene.

The alpha-olefinic monocarboxylic acids can be represented by the general formula:

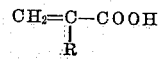

wherein R is either hydrogen or a lower alkyl group of from 1 to 4 carbon atoms and include, for example, acrylic acid, methacrylic acid, alpha-ethyl acrylic acid, alpha-propyl acrylic acid, alpha-isopropyl acrylic acid, and alpha-butyl acrylic acid.

The esters of the alpha-olefinic monocarboxylic acid which are used as the third component in the manufacture of the copolymer can be represented by the general formula:

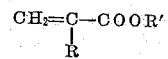

wherein R is either hydrogen or a lower alkyl group of from 1 to 4 carbon atoms and R' represents an alkyl or cycloalkyl group of from 1 to 8 carbon atoms. Examples of these esters include methyl acrylate, ethyl acrylate, propyl acrylate, isopropyl acrylate, butyl acrylate, octyl acrylate, 2-ethyl hexyl acrylate, cyclohexyl acrylate, methyl methacrylate, methyl alpha-ethyl acrylate, ethyl methacrylate, butyl methacrylate and butyl alpha-ethyl acrylate.

Although the preferred copolymer is a terpolymer consisting of one monomer from each of the three groups just described, more than one monomer from each group can be used. For example, several polymerizable styrene monomers, or several alpha olefinic monocarboxylic acids having a methylene group bonded to the alpha carbon atom, or several esters of the alpha-olefinic monocarboxylic acids can be copolymerized.

Although the polymerization of the dispersed monomers can be carried on at any temperature from the freezing point of the water to the refluxing temperature of the charge, temperatures of from 120 to 160° F. are preferred. At this temperature the polymerization usually takes from 1 to 3 hours. After the polymerization is completed, the dispersion is sometimes blown with air to volatilize any excess monomer.

The coating composition is completed by blending the water-dilutable heat-reactive formaldehyde condensation resin into the copolymer dispersion. The resins used in this invention are those formed by the condensation of phenols, urea, melamine or combinations thereof with formaldehyde. They include, for example, phenol/formaldehyde, urea/formaldehyde, melamine/formaldehyde, and urea/melamine/formaldehyde resins. "Water-dilutable" as used herein refers to formaldehyde condensation resins which are soluble in water or to liquid resins or to finely ground solid resins which can be colloidally dispersed in water. Preferably, the resins are water-soluble and have a molecular weight of less than 5000.

When the final composition is to be applied, dried and cured at room or moderate temperatures below 200° F., up to 150% by weight, based on the copolymer, of a coalescing agent such as tetramethylene sulfone, cyclic ethylene carbonate, dimethyl formamide, dimethyl acetamide, alkyl monoethers of ethylene glycol or diethylene glycol and diacetone alcohol can be added to the copolymer dispersion. These materials are solvents for the copolymer and facilitate coalescing when the composition is dried.

The composition of this invention can be further modified by the addition of plasticizers, stabilizers, extenders and pigments in accordance with conventional practices in making coatings.

Because of the carboxyl groups on the alpha-olefinic monocarboxylic acid in the copolymer, the coating composition just described usually has a pH of from 2 to 4.

Although the acidic composition can be used, the applied coating coalesces better and is smoother if at least a portion of these carboxyl groups are neutralized with a volatile base, preferably ammonium hydroxide or an organic alkaline material such as, for example, monoethanol amine, triethanol amine, n-butyl amine, methyl amine, dimethyl amine, trimethyl amine, morpholine or picoline.

To neutralize the copolymer, enough base is added to the coating composition to raise the pH to at least 7 and preferably for storage stability, to greater than 9. This treatment ordinarily neutralizes from 50 to 100% of the carboxyl groups on the copolymer, and, in addition to making a smoother coating, reduces coagulation on storage and stabilizes the viscosity of the dispersion.

With pigmented compositions, the volatile base required to bring the pH to above 7 is usually added to the acidic copolymer dispersion before it is mixed with the formaldehyde condensation resin. With unpigmented materials it is preferably added in two portions followed by a heating step. First, prior to the blending of the formaldehyde condensation resin, the pH of the dispersion of the copolymer is increased to about from 5 to 7. After any polymer grit or coagulum which has settled is removed, the condensation resin is incorporated into the dispersion and an additional quantity of volatile base is added to bring the pH to at least 7 and preferably to greater than 9. Finally, the coating composition is heated at from 110 to 200° F. for from 5 minutes to 4 hours and preferably for from 15 to 120 minutes.

The coating compositions of this invention can be applied by any of the conventional methods used for aqueous dispersion products such as brushing, spraying, flow coating, rolling, electrostatic spraying, and steam spraying. Once applied, the materials can be dried and cured at temperatures ranging from room temperature to 600° F. Preferably the materials are dried for from 60 to 5 minutes at from 200 to 400° F.

The composition of this invention can be used as an impregnant or a protective, insulating or primer coating. It can be applied to a wide variety of substrates including wood, fibers, and metals, such as, for example, aluminum, copper and bonderized steel. It is particularly useful as a primer coating for automotive and appliance finishes. In such applications, the composition forms a tough, smooth film to which enamels adhere well.

The following examples are intended to illustrate the invention and not to limit it in any way.

Example I

The following materials were charged to a polymerization vessel equipped with a stirrer, reflux column, and thermometer:

|  | Parts by weight |
|---|---|
| Water | 150.8 |
| Sodium bisulfite | 0.1 |
| Polyoxyethylene-polyoxypropylene (10/90 mole ratio)—"Pluronic" L-61 (Wyandotte Chemicals Corps.) | 1.5 |
| Styrene | 50.0 |
| Methacrylic acid | 10.0 |
| Butyl acrylate | 40.0 |
| Potassium persulfate | 0.4 |
| | 252.8 |

First, part of the polyoxyethylene-polyoxypropylene dispersing agent and sodium bisulfite initiator were added to the water. Next, the monomers were dispersed in the water. The charge was completed by adding the remainder of the dispersing agent and potassium persulfate initiator. When all the components were thoroughly mixed, the charge was heated under an atmosphere of nitrogen for 3 hours at a temperature of about 150° F. The resulting terpolymer dispersion had a solids content of 39%.

After 2 parts by weight of monoethanol amine had been added to the terpolymer dispersion, 64 parts of an aqueous solution containing 66% by weight of phenol formaldehyde resin, "Bakelite" BR 15100 (Bakelite Corp.) was mixed into the terpolymer. Finally, 2 more parts by weight of monoethanol amine and 31 parts by weight of water were added to the dispersion. The resulting composition was heated for 1 hour at 185° F., then cooled. The finished product had the following properties:

pH 8.1
Viscosity 2 poises
Weight percent solids 41.5

The viscosity in this and the following examples was determined at 25° C. on a Brookfield viscosimeter operating at 6 r.p.m. with a No. 2 spindle.

The product of this example formed a tough, solvent-resistant coating and was suitable as a steel fuel tank coating.

The procedure just outlined can be repeated using 10 parts by weight of acrylic acid instead of methacrylic acid. The resulting product has essentially the same properties as those shown above.

Example II

A pigment dispersion consisting of the following components was ground for 1 hour in a pebble mill:

| | |
|---|---|
| Titanium dioxide | 26.5 |
| Calcium metasilicate | 10.1 |
| China clay | 33.9 |
| Purified magnesium montmorillonite clay (water-swellable hydrous magnesium silicate) | 0.3 |
| Water | 29.2 |
| | 100.0 |

To this mixture was added 0.4 part by weight of polyoxyethylene-polyoxypropylene dispersing agent and 36 parts by weight of a 66% aqueous solution of phenol formaldehyde resin ("Bakelite" BR 15100); then, the combination was milled in the pebble mill for 72 hours. Finally 6.3 parts by weight of monoethanol amine and 0.3 part by weight of sulfated castor oil antifoament were mixed with 133 parts by weight of a terpolymer dispersion similar to that used in Example I and fed to the pebble mill where the terpolymer, phenol formaldehyde resin, and pigment were ground for 1 hour. The resulting composition had a pH of 9.5 and a viscosity of 3.5 poises at 25° C.

The pigmented composition just described was flow coated onto a piece of 16 gauge bonderized steel sheeting and baked for 20 minutes at a temperature of 350° F. The resulting coating had an average thickness of about 0.6 mil. On top of the baked primer coat, a coat of white alkyd appliance enamel was applied then baked for 30 minutes at 300° F. When the coated and baked steel sheet was flexed, bent and dented, the smooth baked finish showed excellent crack resistance and the enamel top-coat did not flake off. In addition, the coating had excellent abrasion and scratch resistance.

*Example III*

Water was refluxed for 15 minutes to eliminate free oxygen, then a terpolymer dispersion was formed from the following charge by the procedure shown in Example I.

| | Parts by weight |
|---|---|
| Water | 150.0 |
| Sodium bisulfite | 0.1 |
| Sodium lauryl sulfate | 0.5 |
| Styrene | 55.0 |
| Methacrylic acid | 5.0 |
| Butyl acrylate | 40.0 |
| | 250.6 |

The polymerization reaction was run for 1½ hours at about 150° F.

A pigment mixture having the following composition was ground for 4 hours on a pebble mill:

| | Parts by weight |
|---|---|
| Water | 26 |
| Titanium dioxide | 35 |
| Zinc oxide | 35 |
| Sulfated castor oil (antifoament) | 1 |
| Sodium polycarboxylate (wetting agent)—"Tamol" 731 (Rohm and Haas Co.) | 3 |
| Ethylene oxide-octyl phenol dispersing agent (reaction product of 12 to 13 moles of ethylene oxide with 1 mole of octyl phenol) | 0.3 |

The terpolymer dispersion was filtered through felt to remove grit and coagulum, neutralized to a pH of about 9 with triethylamine and combined with the following ingredients to yield the finished coating composition:

| | |
|---|---|
| Terpolymer dispersion | 250.6 |
| Pigment mixture | 252.5 |
| Triethylamine | 4.2 |
| Phenol formaldehyde resin solution (66% by weight of resin)—"Bakelite" BR 15100 | 27.8 |
| Diacetone alcohol | 12.6 |
| | 547.7 |

A 0.9 mil film of this coating was sprayed onto a sheet of bonderized steel and baked for 30 minutes at 300° F. A topcoat of enamel 0.6 mil thick was sprayed on top of the primer and the coated sheet was baked another 30 minutes at 300° F.

The baked primer-enamel coating had good soap, detergent and water resistance. In addition, when the sheet was flexed and dented the enamel showed excellent crack resistance and did not flake off.

*Example IV*

A solution consisting of 109 parts by weight of water, 0.1 part by weight of sodium bisulfite and 0.01 part by weight of sodium lauryl sulfate was heated to 176° F. and to it, in order, the following materials were added:

| | Parts by weight |
|---|---|
| Styrene | 55.0 |
| Methacrylic acid | 5.0 |
| Ethyl acrylate | 40.0 |
| Potassium persulfate | 0.4 |
| Water | 17.5 |

The charge was heated for 30 minutes at 150° F., then, after the addition of 0.5 more parts by weight of sodium lauryl sulfate and 7.5 parts by weight of water, the reaction was continued for another 2½ hours at 149° F.

The finished coating composition was then prepared by neutralizing 100 parts by weight of the terpolymer dispersion just described with 2 parts by weight of 28% ammonium hydroxide, mixing the neutralized dispersion with 26 parts of a 66% aqueous solution of phenol formaldehyde resin (BR 15100 "Bakelite"), and then combining the resulting dispersion with 7 parts by weight of monoethanolamine and 184 parts by weight of a pigment comprising a water slurry of barytes and titanium dioxide. The resulting composition had the following properties:

Viscosity 3 poises
pH 9.5
Weight percent solids 49.7

A film of this coating composition with an average thickness of 0.6 mil was flow coated on a steel sheet and baked for 20 minutes at 350° F. A top-coat of standard pigmented appliance enamel with a vehicle containing about 70 percent by weight of non-drying oil, alkyd resin and about 30 percent by weight of butylated urea formaldehyde resin was sprayed onto the sheet, then baked for 30 minutes at 300° F. The combined primer and enamel coating had the same excellent chemical and physical properties described in the preceding examples.

*Example V*

An aqueous terpolymer dispersion having the following composition was formed by the same procedure used in Example IV:

| | Parts by weight |
|---|---|
| Water | 154.0 |
| Sodium bisulfite | 0.1 |
| Styrene | 56.4 |
| Methacrylic acid | 2.6 |
| Butylacrylate | 41.0 |
| Sodium lauryl sulfate | 0.5 |
| Potassium persulfate | 0.4 |
| | 255.0 |

The terpolymer dispersion contained 37% by weight of solids and had a pH of 2.5 and a viscosity of 0.1 poise.

The finished coating composition was formed by blending the terpolymer with the following materials.

| | Parts by weight |
|---|---|
| Terpolymer dispersion | 255 |
| Phenol formaldehyde resin solution (66% by weight of resin)—"Bakelite" BR 15100 | 62 |
| Pigment (same as Example IV) | 392 |
| Monoethanol amine | 15 |
| Sulfated castor oil (antifoament) | 10 |
| | 734 |

The finished coating composition had the following properties:

pH 9.7
Viscosity 13 poises
Weight percent solids 52

Example VI

An aqueous terpolymer dispersion having the following composition was formed by the procedure used in Example IV:

| | Parts by weight |
|---|---|
| Water | 136.5 |
| Sodium bisulfite | 0.1 |
| Styrene | 50.0 |
| Methacrylic acid | 13.6 |
| Butyl acrylate | 36.4 |
| Sodium lauryl sulfate | 0.4 |
| Potassium persulfate | 0.4 |
| | 237.4 |

The terpolymer dispersion contained 40% by weight of solids and had a pH of 2.3 and a viscosity of 0.25 poise.

An unpigmented coating composition was prepared by blending 100 parts by weight of the terpolymer dispersion just described with 33 parts by weight of a 66% solution of phenol formaldehyde resin ("Bakelite" BR 15100) and 2 parts by weight of a 28% solution of ammonium hydroxide. The resulting composition had a pH of 7.1.

Example VII

A terpolymer dispersion similar to that shown in Example I was prepared. One hundred parts by weight of this dispersion was mixed with 25 parts by weight of a 66% aqueous solution of phenol formaldehyde ("Bakelite" BR 15100) and 0.8 part by weight of 28% ammonium hydroxide and heated to 185° F. for 1 hour. Finally, the composition was further neutralized with 1.2 more parts by weight of ammonium hydroxide and diluted with 45 parts of water. The resulting unpigmented coating composition contained 33.5% by weight of solids and had a pH of 7.5 and a viscosity of 0.1 poise.

I claim:

1. A coating composition comprising an aqueous dispersion of a copolymer polymerized from a mixture of monomers consisting of (A) about 20 to 70 parts by weight of at least one monofunctional polymerizable vinylbenzene monomer, (B) about 1 to 20 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight of said monomeric mixture, and about from 5 to 300 parts by weight of a water-dilutable heat-reactive condensation resin of formaldehyde and at least one of the group consisting of phenols, urea and melamine.

2. The composition of claim 1 wherein the copolymer is in the form of a salt, the cation of which resolves into a volatile base.

3. A coating composition comprising an aqueous dispersion of a copolymer polymerized from a mixture of monomers consisting of (A) about 40 to 60 parts by weight of at least one monofunctional polymerizable vinylbenzene monomer, (B) about 3 to 15 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight of said monomeric mixture, and from about 25 to 70 parts by weight of a water-dilutable heat-reactive condensation resin of formaldehyde and at least one of the group consisting of phenols, urea and melamine.

4. The composition of claim 3 wherein at least 50% of the carboxyl groups on the alpha-olefinic monocarboxylic acid in the copolymer are neutralized by one of the group consisting of ammonia and a volatile monoamine.

5. A coating composition comprising an aqueous dispersion of a copolymer polymerized from a mixture of monomers consisting of (A) about 40 to 60 parts by weight of styrene, (B) about from 3 to 15 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight of said monomeric mixture, and about from 25 to 70 parts by weight of a water-dilutable heat-reactive condensation resin of phenol and formaldehyde.

6. A coating composition comprising an aqueous dispersion of a terpolymer polymerized from a mixture of monomers consisting of (A) about 40 to 60 parts by weight of styrene, (B) about 3 to 15 parts by weight of methacrylic acid and (C) butyl acrylate as the balance for a total of 100 parts by weight of said nonomeric mixture, and about from 25 to 70 parts by weight of a water-dilutable heat-reactive condensation resin of phenol and formaldehyde.

7. A coating composition comprising an aqueous dispersion of a terpolymer polymerized from a mixture of monomers consisting of (A) about 40 to 60 parts by weight of styrene, (B) about 3 to 15 parts by weight of methacrylic acid and (C) ethyl acrylate as the balance for a total of 100 parts by weight of said monomeric mixture, and about from 25 to 70 parts by weight of a water-dilutable heat-reactive condensation resin of phenol and formaldehyde.

8. A substrate coated with a dried and cured composition comprising a copolymer polymerized from a mixture of monomers consisting of (A) about 20 to 70 parts by weight of at least one monofunctional polymerizable vinylbenzene monomer, (B) about 1 to 20 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight of said monomeric mixture, and about from 5 to 300 parts by weight of a water-dilutable heat-reactive condensation resin of formaldehyde and at least one of the group consisting of phenols, urea and melamine.

9. The article of claim 8 wherein the substrate is a metal sheet.

10. The article of claim 8 coated with an enamel topcoat.

11. The process which comprises forming a copolymer by the emulsion polymerization in water of (A) about 20 to 70 parts by weight of at least one monofunctional polymerizable vinylbenzene monomer, (B) about from 1 to 20 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight, and blending about 5 to 300 parts of a water-dilutable heat-reactive condensation resin of formaldehyde and at least one of the group consisting of phenols, urea and melamine in the aqueous dispersion of said copolymer.

12. The process which comprises forming a copolymer by the emulsion polymerization in water of (A) about 20 to 70 parts by weight of at least one monofunctional polymerizable vinylbenzene monomer, (B) about 1 to 20 parts by weight of at least one alpha-olefinic monocarboxylic acid having a methylene group bonded to the alpha carbon atom and (C) at least one ester of one of said alpha-olefinic monocarboxylic acids with a saturated aliphatic monohydric alcohol of from 1 to 8 carbon atoms as the balance for a total of 100 parts by weight, adding a volatile base to said dispersed copolymer to bring the pH of the aqueous composition to at least 7 and blending about 5 to 300 parts by weight of a water-dilutable heat-reactive condensation resin of formaldehyde and at least one of the group consisting of phenols, urea and melamine with said dispersed copolymer.

13. The process which comprises forming a copolymer by the emulsion polymerization in water of (A) about 20 to 70 parts by weight of at least one monofunctional polymerizable vinylbenzene monomer, (B) about 1 to 20 parts by weight of at least one alpha-olefinic monocarboxylic acid having a methylene group bonded to the alpha-carbon atom and (C) at least one ester of one of said alpha-olefinic monocarboxylic acids with a saturated aliphatic monohydric alcohol of from 1 to 8 carbon atoms as the balance for a total of 100 parts by weight, adding a volatile base to the said dispersed copolymer to bring the pH of the aqueous composition to from 5 to 7, blending about 5 to 300 parts by weight of a water-dilutable heat-reactive condensation resin of formaldehyde and at least one of the group consisting of phenols, urea and melamine with said dispersed copolymer, adding an additional amount of said base to the aqueous composition to bring the pH to at least 7 and heating the resulting composition to from 110 to 200° F. for from 5 minutes to 4 hours.

14. A process which comprises forming a copolymer by the emulsion polymerization in water of (A) about 20 to 70 parts by weight of at least one monofunctional polymerizable vinylbenzene monomer, (B) about 1 to 20 parts by weight of at least one alpha-olefinic monocarboxylic acid having a methylene group bonded to the alpha-carbon atom and (C) at least one ester of one of said alpha olefinic monocarboxylic acids with a saturated aliphatic monohydric alcohol of from 1 to 8 carbon atoms as the balance for a total of 100 parts by weight, blending about from 5 to 300 parts by weight of a water-dilutable heat-reactive condensation resin of formaldehyde and at least one of the group consisting of phenols, urea and melamine in the aqueous dispersion of said copolymer, applying the resulting aqueous composition to a substrate, and heating said coated substrate to coalesce and cure the composition.

References Cited in the file of this patent

UNITED STATES PATENTS

| | | |
|---|---|---|
| 2,557,266 | Dittmar et al. | June 19, 1951 |
| 2,563,898 | Wilson et al. | Aug. 14, 1951 |
| 2,754,280 | Brown | July 10, 1956 |
| 2,760,886 | Prentiss et al. | Aug. 28, 1956 |
| 2,787,603 | Sanders | Apr. 2, 1957 |
| 2,794,742 | Fowler et al. | June 4, 1957 |